May 6, 1952

G. P. GILBERTSEN 2,595,933

RUG RINSER

Filed July 23, 1949

INVENTOR
GILBERT P. GILBERTSEN
BY

ATTORNEY

Patented May 6, 1952

2,595,933

UNITED STATES PATENT OFFICE 2,595,933

RUG RINSER

Gilbert P. Gilbertsen, Overland, Mo., assignor to Magnus R. Snipen, St. Louis, Mo.

Application July 23, 1949, Serial No. 106,422

1 Claim. (Cl. 299—56)

This invention relates to rug rinsers, and is particularly adapted for use by rug cleaning establishments to remove from a rug by means of clear water the agent (such as soap, or a chemical) with which it has been cleansed.

The principal object of the invention is to produce a rinser in which a plurality of spray nozzles are so mounted that they may be raised or lowered to the most effective spraying position by merely turning an eccentrically mounted element associated with the pipe carrying said nozzles, and in which the spray from adjacent nozzles will overlap, so that a wide area may be sprayed without leaving small portions therein which have not been reached by the rinsing water. An important feature of the invention is that it may be connected to a source of air pressure to drive the water with the necessary degree of force for rinsing, another advantage being that the nozzles may be so positioned as to spray the water onto the rug at the most effective angle.

Figures 1, 2, 3:
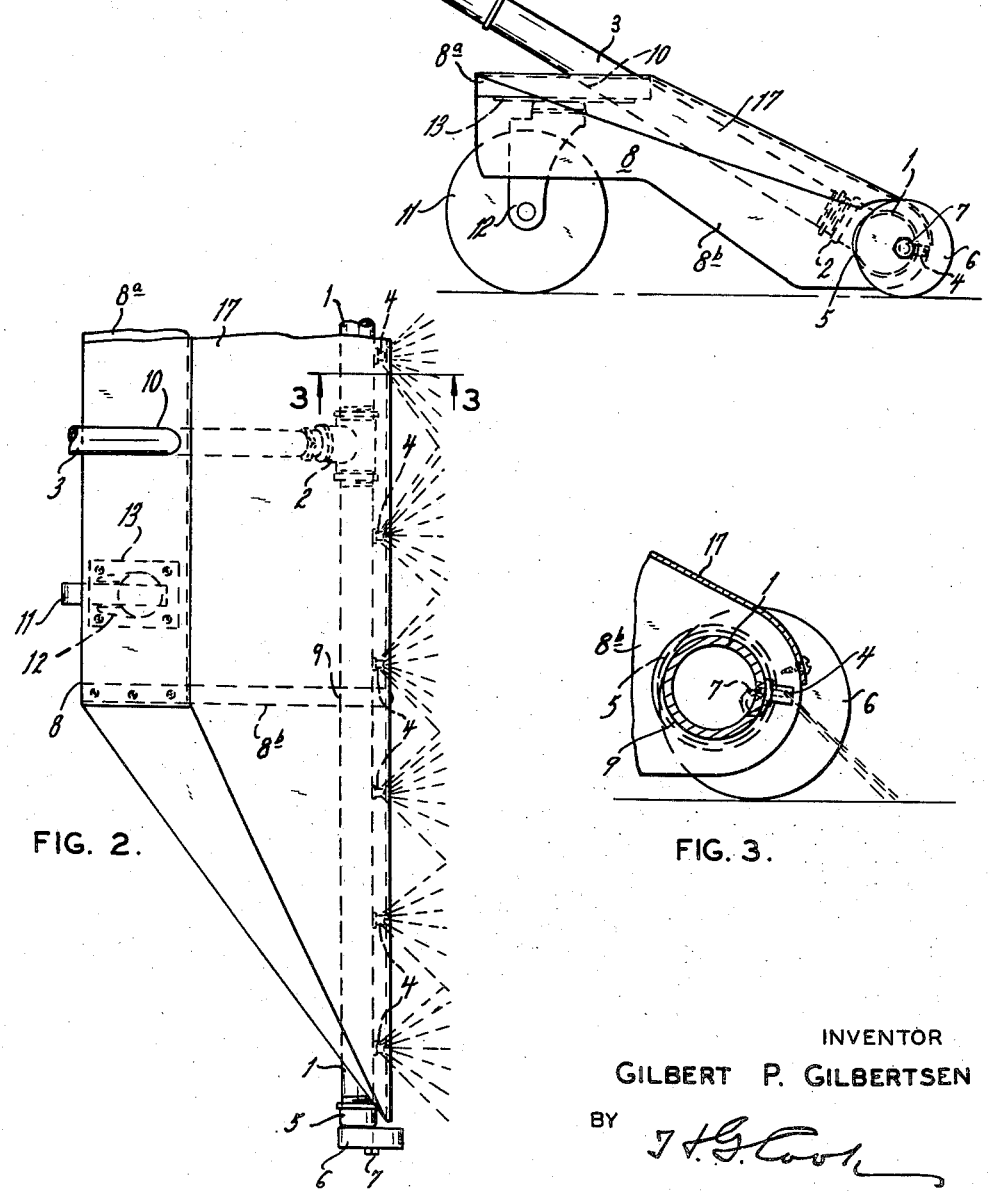
Fig. 1 is a side elevation of the rug rinser as it appears when ready for operation, partly broken away.
Fig. 2 is a top plan view of the rug rinser (partly broken away), as it appears in operation, showing particularly the overlapping of the water sprays.
Fig. 3 is an enlarged detail view taken on line 3—3, Fig. 2, illustrating particularly the spray nozzles and the eccentric mounting of the means for raising and lowering the support for said nozzles.

The invention comprises a horizontally disposed pipe 1 of such length as to extend across a relatively wide portion of the rug which is being sprayed. At its center the pipe 1 is coupled in any convenient manner, for instance, by a T-coupling, as shown at 2, to a pipe 3 which extends from the pipe 1 at an acute angle, as seen in Fig. 1. At regularly spaced intervals the pipe 1 is perforated for the reception of a plurality of spray nozzles 4, which are so positioned on the pipe 1 that the spray issuing from said nozzles will strike the rug at a predetermined angle. It is understood, of course, that the rug is spread out on the floor so that the rinser may be moved about on the surface of the rug.

The pipe 1 is closed at each of its ends by a cap 5, and adjacent the outer side of each of the caps 5 a wheel 6 is rotatably mounted on a bolt 7 which extends inwardly through the wheel to permit the wheel 6 to be accentrically mounted on said cap 5, as will be understood from Fig. 2, so that the caps 5 and the pipe 1 engaged therewith escape the floor.

A framework 8, comprising a horizontal portion 8a and downwardly extending, diagonal arms 8b, assists in supporting the pipe 1, which passes through openings 9 in the arms 8b, the framework being positioned at the central portion of said pipe. The framework also supports the pipe 3, which passes diagonally through an opening 10 in the horizontal portion 8a thereof, and a pair of rear wheels 11, of larger diameter than the wheels 6, are secured to the underside of the portion 8a of the framework, so that the rinser may be propelled on the four wheels 6—6 and 11—11, respectively. The wheels 11 may be secured to the framework in any convenient manner, but in the drawing I have shown them as being rotatably mounted in a pair of elements 12 depending from a plate 13 which is fastened to the underside of the framework portion 8a.

The pipe 3, which is adapted to be connected to any source of water supply, is provided with a control valve 14. The pipe 3 as shown in Fig. 1 of the drawing also is in communication with a pipe 15 which is adapted to be connected to a source of air pressure, which pipe 15 may be capped, as shown at 16, when air pressure is not desired.

To protect the device from dust and accidents, I provide a shield or cover 17 which fits over the framework 8 and is of such width as to extend across the pipe 1. The cover 17 may be secured to the framework in any convenient manner, and is not essential to the operation of the device, but does assist in directing the sprays of water downwardly.

In operation the procedure is as follows:

The pipe 3 is connected through a hose 18 to a source of water supply, the valve 14 being at this time in closed condition. The rinser is then propelled on its wheels 6—6 and 11—11 into position on a rug (not shown) which has been cleansed and is spread on the floor preparatory to being rinsed. Depending on the thickness of the rug, the pipe 1 and its associated spray nozzles 4 are then raised or lowered to the most effective height by manipulating the eccentrically mounted caps 5. The device is now in readiness for the rinsing operation.

The valve 14 is opened to permit water to flow through the pipe 3 and into the pipe 1, from which it is discharged through the nozzles 4. As mentioned above, these nozzles are so spaced apart that their respective sprays overlap each other where they strike the rug, so that no portion of the rug within the spraying zone is left unrinsed, as will be understood from Fig. 2. For a thorough rinsing the device may be moved about over the rug on its wheels 6—6 and 11—11 until every part of the rug has been sprayed.

When the pressure of the water from the source of supply is less than approximately 25 pounds, its force will not be sufficient to thoroughly rinse the rug. In this event the pipe 15 is uncapped and attached to a source of air pressure (not shown) which will drive the water through the pipes 3 and 1 and out through the nozzles 4 with the necessary force.

When the rinsing operation has been completed, the water is shut off by returning the valve 14 to its closed position, and the device may be wheeled away from the rug.

I claim:

A rinser for floor rugs comprising a transverse, perforated member and spraying nozzles mounted therein, said nozzles being so spaced apart that the sprays from adjacent nozzles overlap each other, means for conveying water from a source of supply to said nozzles, a wheel at each end of said transverse member, a pair of eccentrically mounted supports for said transverse member eccentrically mounted on said wheels and adapted to permit vertical adjustment thereof, means for directing air pressure into said water-conveying means, and a frame including a support for said water-conveying means and provided with extensions for supporting said transverse member, a water control valve in said water-conveying means, and said rug rinser being adapted to be propelled on said wheels over the surface of a floor rug to be rinsed.

GILBERT P. GILBERTSEN.

REFERENCES CITED

The following references are of record in the file of this patent:

UNITED STATES PATENTS

| Number | Name | Date |
|---|---|---|
| 545,310 | Richards | Aug. 27, 1895 |
| 900,058 | Connor | Sept. 29, 1908 |
| 1,085,609 | Heath | Feb. 3, 1914 |
| 1,520,854 | Carter | Dec. 30, 1924 |
| 1,724,702 | Flickinger | Aug. 13, 1929 |
| 1,728,113 | Fertally, Sr. | Sept. 10, 1929 |
| 1,733,883 | Jaecks | Oct. 29, 1929 |
| 1,923,689 | Rosenberg | Aug. 22, 1933 |
| 1,949,904 | Guedel | Mar. 6, 1934 |
| 2,490,955 | Foley | Dec. 13, 1949 |